(12) United States Patent
Chien

(10) Patent No.: US 6,312,595 B1
(45) Date of Patent: Nov. 6, 2001

(54) WATER FILTERING SYSTEM

(76) Inventor: Kuang-Hui Chien, No. 207, Tong Su Rd., Tsu-Sie Shian, Tainan Hsieh (TW)

( * ) Notice: Subject to any disclaimer, the term of this patent is extended or adjusted under 35 U.S.C. 154(b) by 0 days.

(21) Appl. No.: 09/611,298

(22) Filed: Jul. 6, 2000

(51) Int. Cl.⁷ .............................. C02F 9/00; B01D 35/06
(52) U.S. Cl. .................. 210/223; 210/259; 210/260; 210/263; 210/264; 210/266; 210/283; 210/284; 210/295
(58) Field of Search ................................ 210/223, 259, 210/260, 263, 264, 266, 283, 284, 295

(56) References Cited

U.S. PATENT DOCUMENTS 5,468,373 * 11/1995 Chou ..................................... 210/223
6,001,249 * 12/1999 Bailey et al. ........................ 210/266

* cited by examiner

Primary Examiner—David A. Reifsnyder
(74) Attorney, Agent, or Firm—Rosenberg, Klein & Lee

(57) ABSTRACT

A water filtering system includes a first filtering device connected between an inlet pipe and a fluid volume meter. A second filtering device is connected to the fluid volume meter and has a ceramic tube received therein. A third filtering device is connected to the second filtering device and has activated carbon particles received therein. The third filtering device is connected to a fourth filtering device which has a plurality of units received therein. Each unit has three partitions and two of which receive two magnetic members.

3 Claims, 8 Drawing Sheets

WATER FILTERING SYSTEM

FIELD OF THE INVENTION

The present invention relates to a water filtering system having a general filtering means, a ceramic filtering means, an activated carbon filtering means and a magnetic member filtering means.

BACKGROUND OF THE INVENTION

A conventional water treatment system generally includes a casing in which a plurality of filtering devices are received and the filtering devices are connected with each other by pipes. An inlet pipe is connected to the first filtering device and an outlet pipe is connected to the final filtering device. Water flows in the first filtering device from the inlet pipe and flows out from the outlet pipe. Particles in the water are retained in the filtering devices while flowing through the filtering devices so that the water is treated. However, only large particles in the water can be removed from the water in the conventional water treatment system. Another type of water filtering system employs a film having tiny holes and the water to be purified is forced to pass the film. The water is called pure water after passing through the film. Nevertheless, the tiny holes are so small that mineral elements in the water are removed from the water and the mineral elements are good for people's health.

The present invention intends to provide a water filtering system that maintains mineral elements in the water and activates the water by magnetic members.

SUMMARY OF THE INVENTION

In accordance with one aspect of the present invention, there is provided a water filtering system and comprising a first filtering device which is connected to a fluid volume meter. A second filtering device has a ceramic tube received therein and a first end of the second filtering device is connected to the fluid volume meter and a third filtering device has an inlet connected to a second end of the second filtering device. Activated carbon particles are received in the third filtering device and an outlet of the third filtering device is connected to a fourth filtering device. The fourth filtering device has an inlet defined in a first end thereof and an outlet is defined in a second end of the fourth filtering device. A plurality of units are received in the fourth filtering device and the units each have a first end which is an open end, and a second end having a plate connected thereto. Each plate has an aperture so that the plate of one unit is engaged with the open end of an adjacent unit. An inlet of the fourth filtering device communicates with the aperture of the plate of one unit adjacent to the inlet of the fourth filtering device. Each unit has two separate boards to define three partitions and two of the three partitions respectively receive a magnetic member therein. The two magnetic members are separated by a middle partition of the three partitions. A final filtering box is received in the fourth filtering device and located adjacent to the outlet of the fourth filtering device.

The primary object of the present invention is to provide a water filtering system wherein magnetic members are used in a filtering device in the system to magnetize the water so that the water carries more oxygen.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
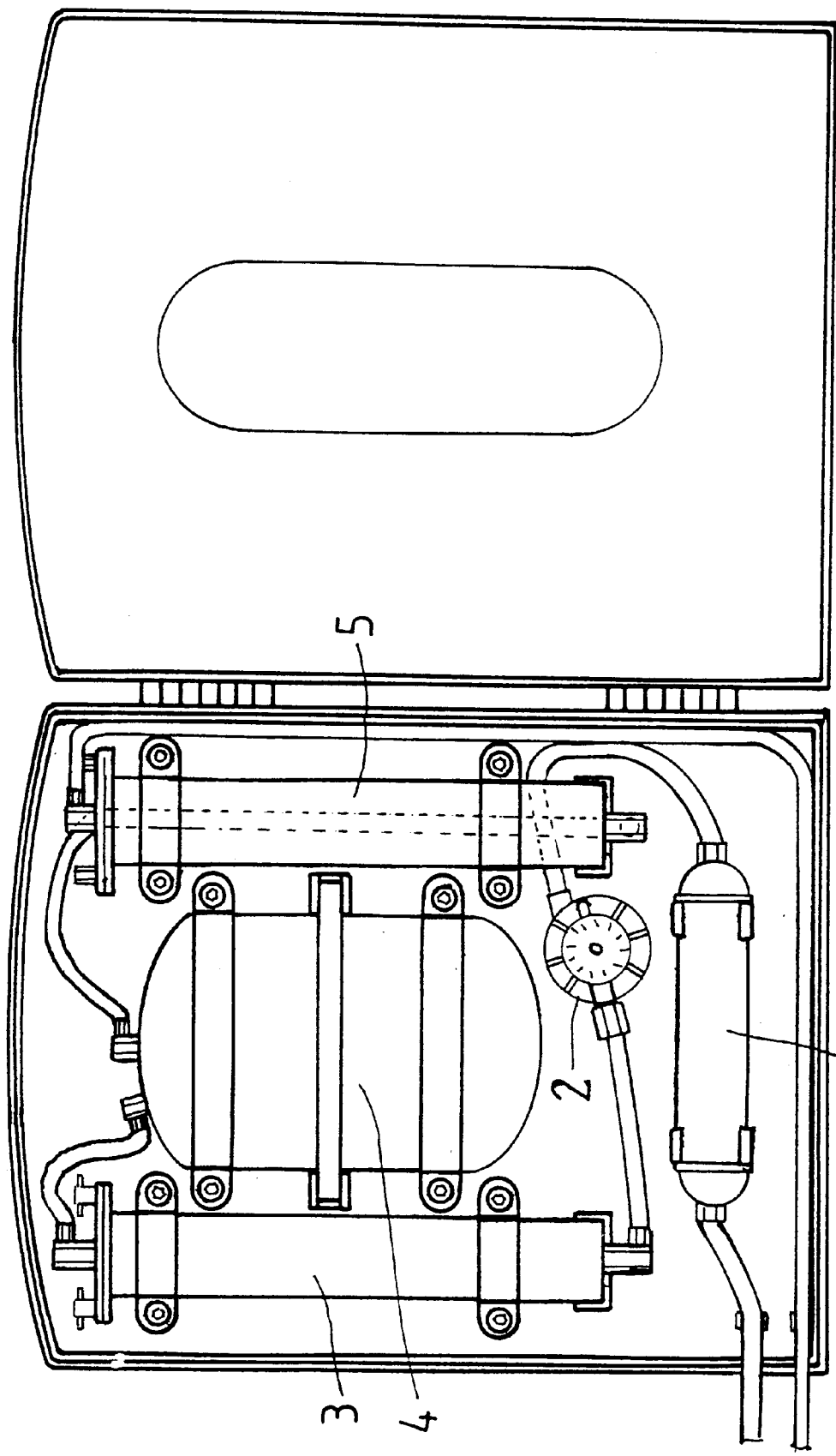
FIG. 1 is an illustrative view to show an arrangement of the filtering devices of the water filtering system of the present invention.
Figure 2:
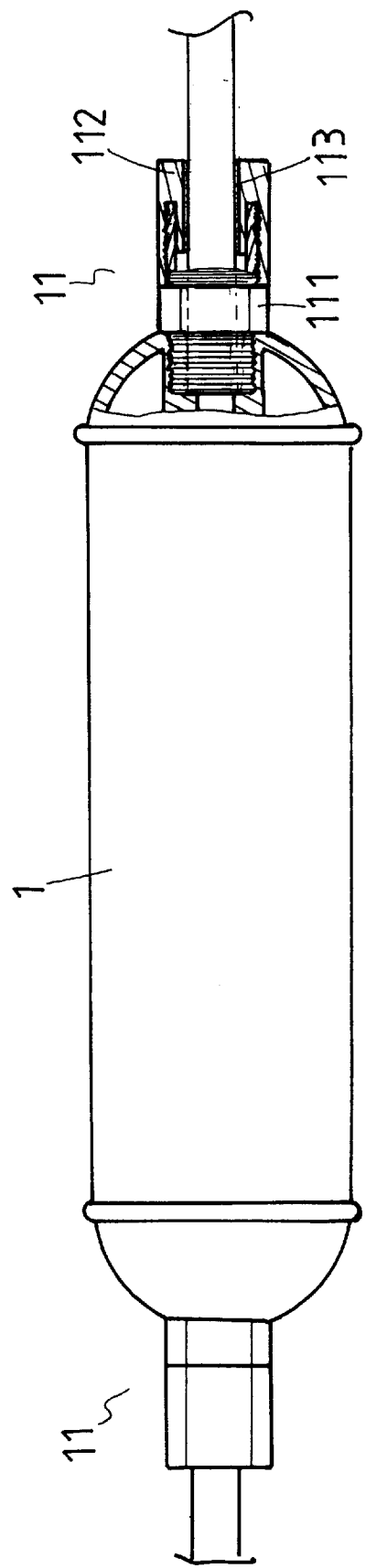
FIG. 2 is a cross sectional view to show a first filtering device of the present invention.

Referring to FIGS. 1 and 2, the water filtering system of the present invention comprises a first filtering device 1 having a first end connected to an inlet pipe and a second end of the first filtering device 1 is connected to a fluid volume meter 2 by an outlet pipe. Each end of the first filtering device 1 includes a fitting 11 which has a tubular connection member 111 threadedly engaged with the first filtering device 1 and the outlet pipe extends through the connection member 111. A fastening member 112 is threadedly mounted to the connection member 111 with a seal 113 clamp between an inside of the fastening member 112 and the outlet pipe.

Figure 3:
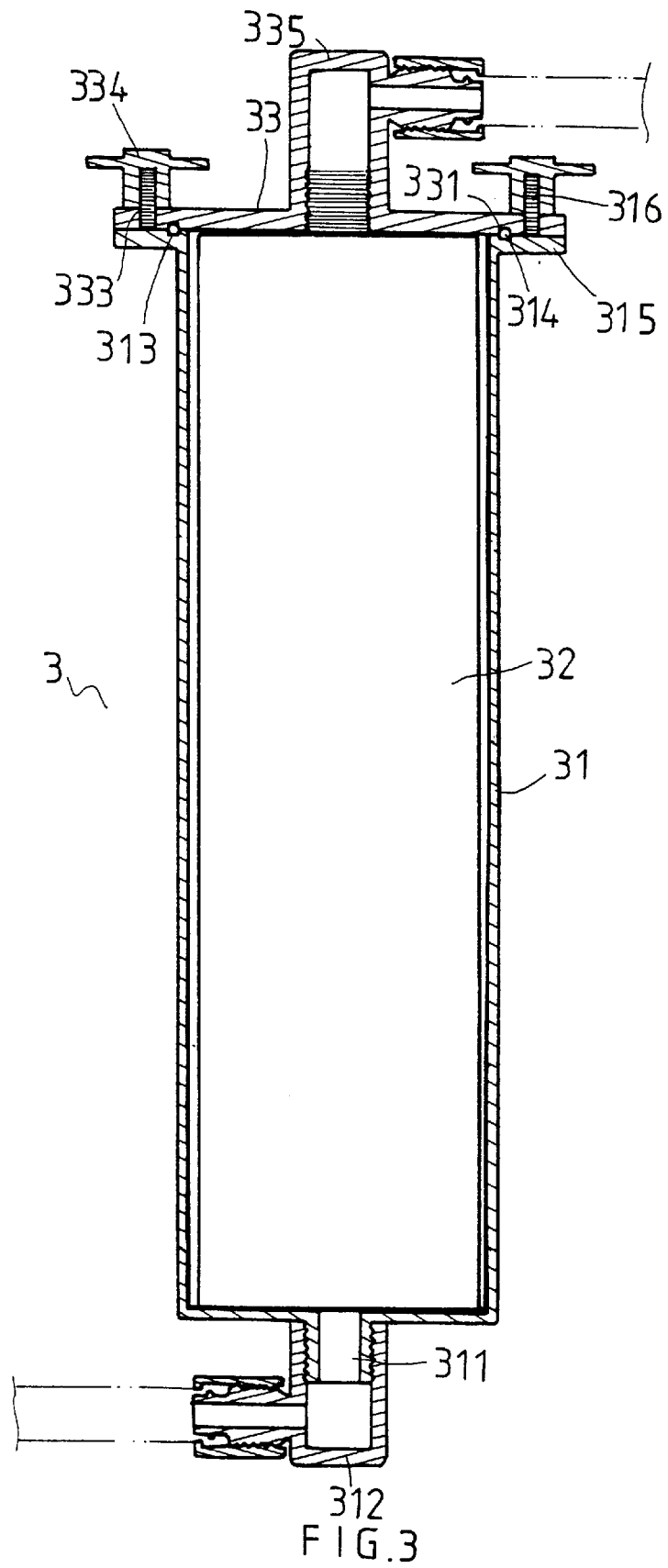
FIG. 3 is a cross sectional view to show a second filtering device of the present invention.
Figure 4:
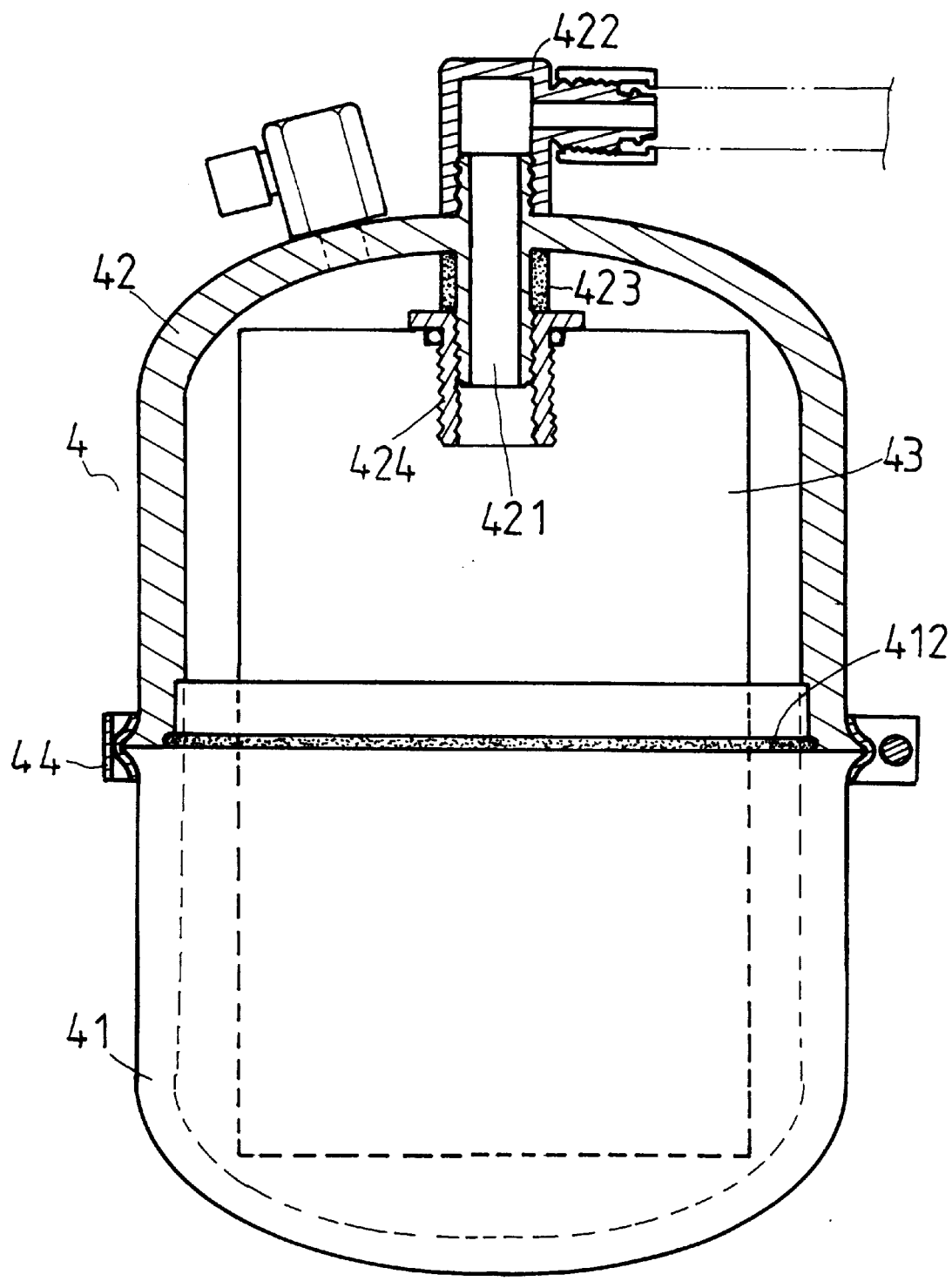
FIG. 4 is a cross sectional view to show a third filtering device of the present invention.

Referring to FIG. 3, a second filtering device 3 has a casing 31 with a ceramic tube 23 received in the casing 31. A first end of the second filtering device 3 has an inlet 311 which is connected to the fluid volume meter 2 by a pipe and a connection member 312 is connected between the inlet 311 and the pipe. A flange 315 extends radially outward from a second end of the second filtering device 3 and two threaded rods 316 respectively extend from the flange 315. A cap 33 has two holes 333 defined therethrough and the two threaded rods 316 extend through the two holes 333 in the cap 33. Two nuts 334 are threadedly mounted to the two threaded rods 316. The cap 33 has a connection member 335 so as to be connected to a pipe. Each of the flange 315 and the cap 33 has a semi-circular groove 313/331 so as to receive a seal 314 in the matched grooves 313 and 331.

A third filtering device 4 is composed of two parts 41, 42 which are matched with each other by a retaining collar 44 and a seal 412 is connected between the two parts 41, 42. A cartridge 43 filled with activated carbon particles is received in the third filtering device 4. The third filtering device 4 has an inlet 40 connected to a second end of the second filtering device 3 and an outlet 421 of the third filtering device 4 is connected to a fourth filtering device 5. The outlet 421 is in a form of a threaded tube and the cartridge 43 has a threaded recess 424 engaged with the threaded tube of the outlet 421. A seal 423 is mounted to the threaded tube of the outlet 421. A connection member 422 is used to connect a pipe which leads to the fourth filtering device 5.

Figure 5:
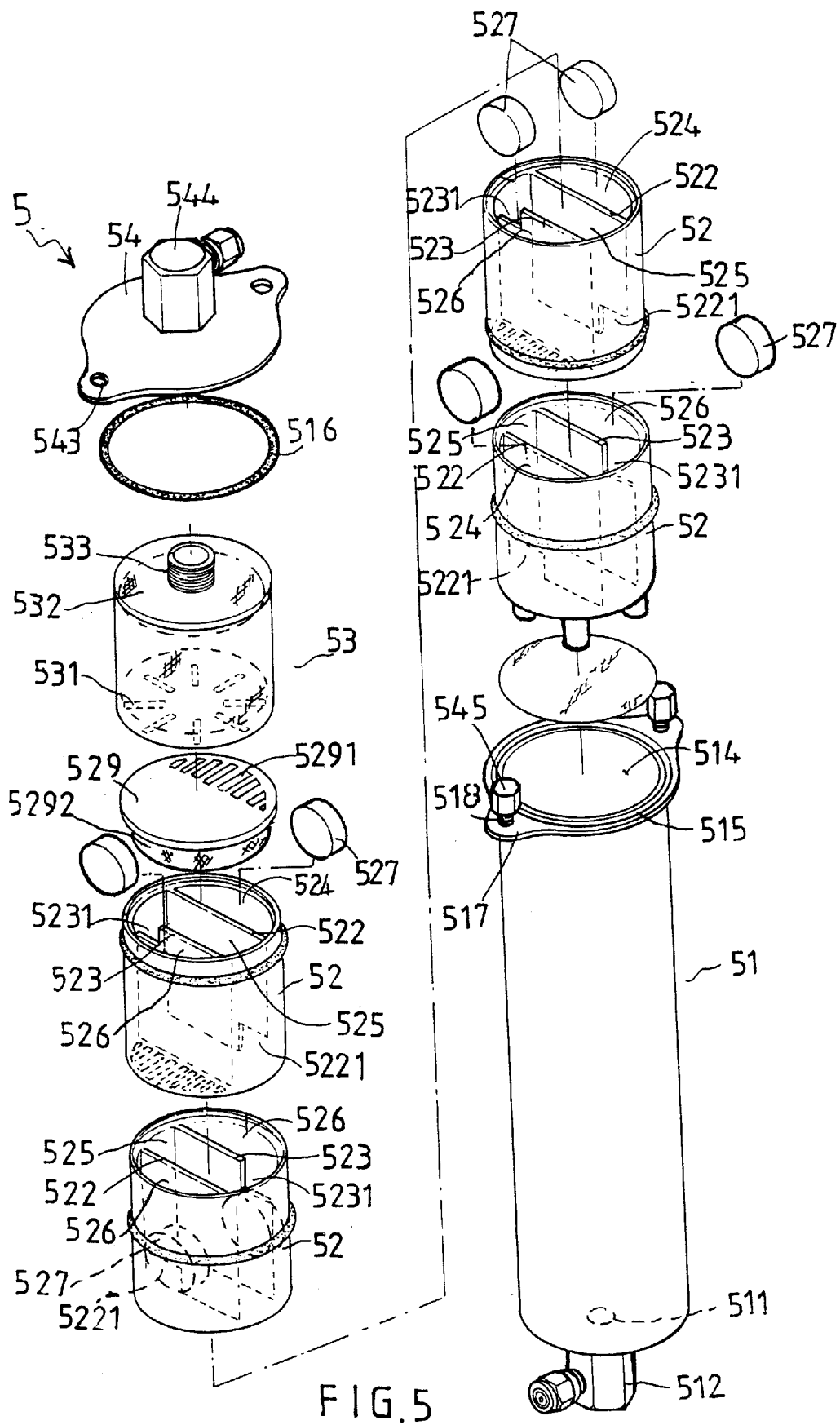
FIG. 5 is an exploded view to show a fourth filtering device of the present invention.
Figure 6:
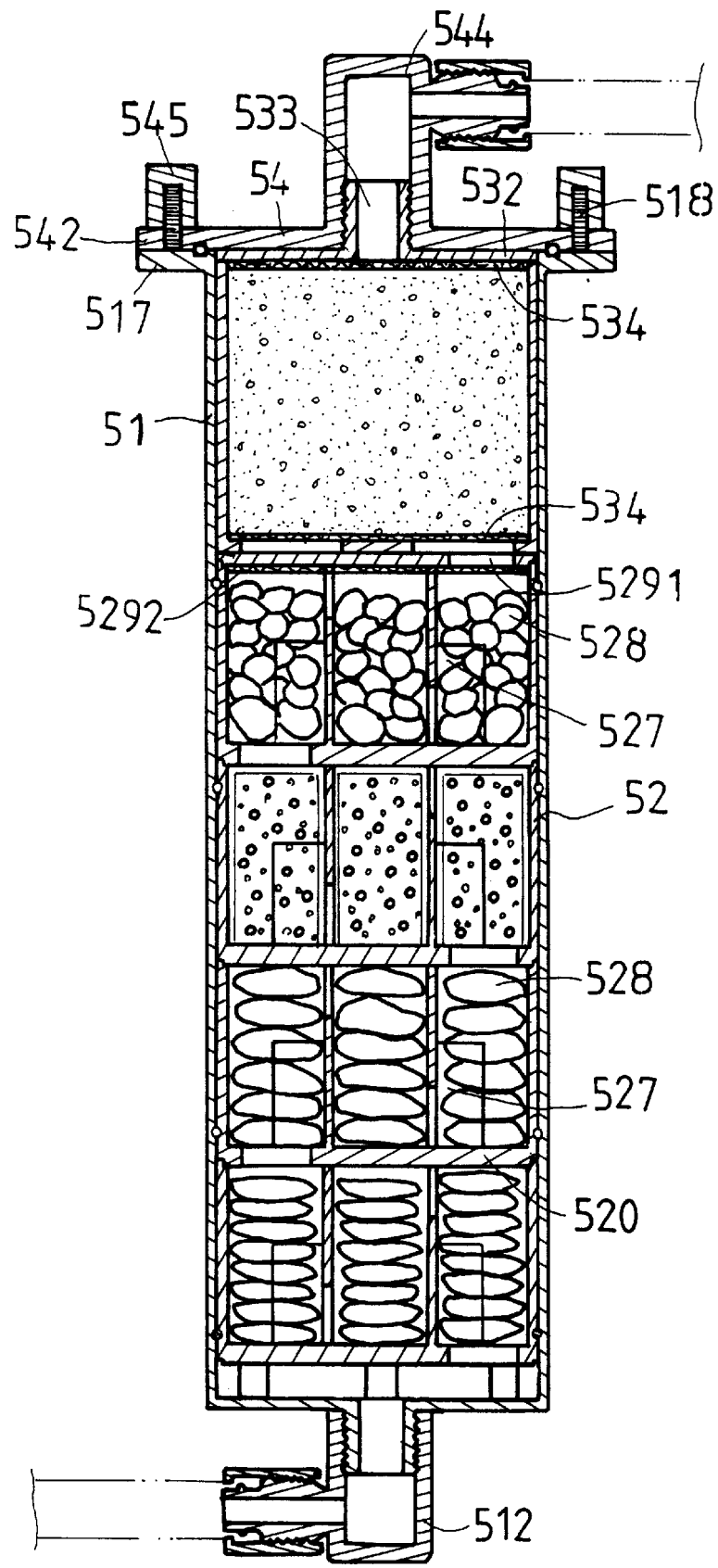
FIG. 6 is a cross sectional view to show the fourth filtering device of the present invention.
Figure 7:
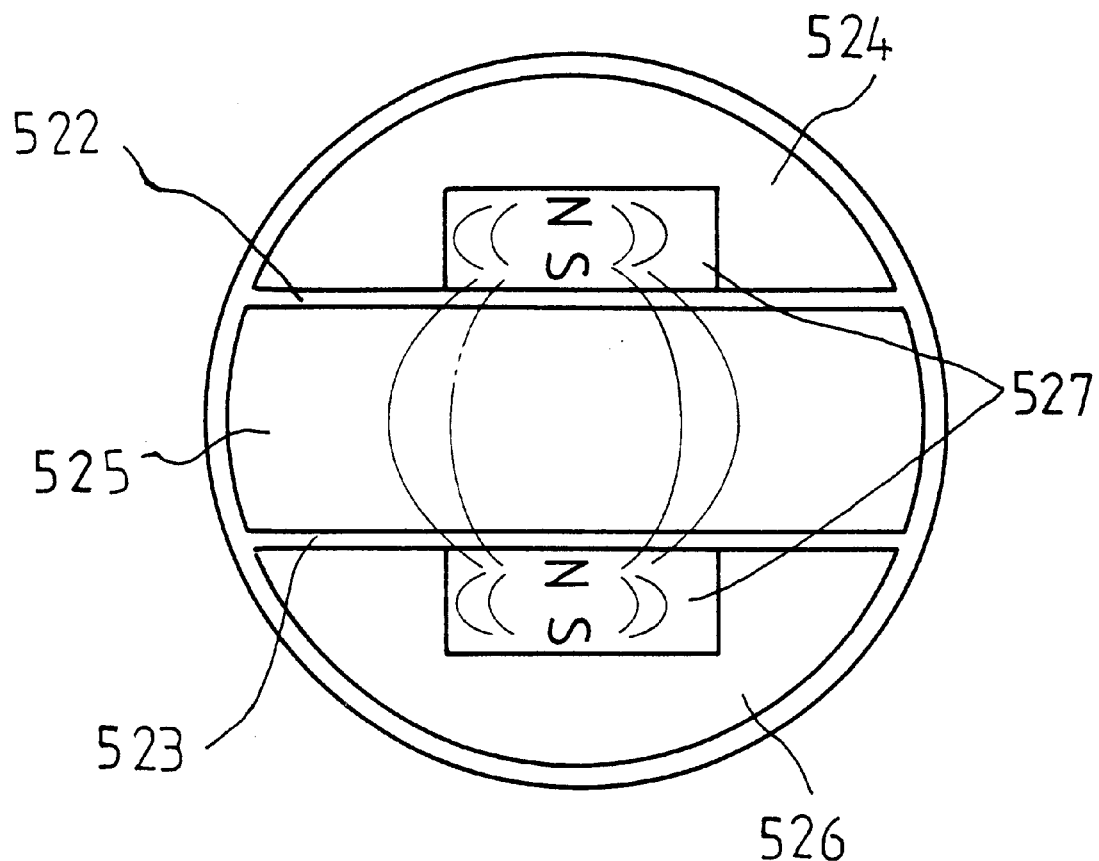
FIG. 7 is an illustrative view to show two magnetic members are received in two of three partitions of each unit in the fourth filtering device of the present invention.
Figure 8:
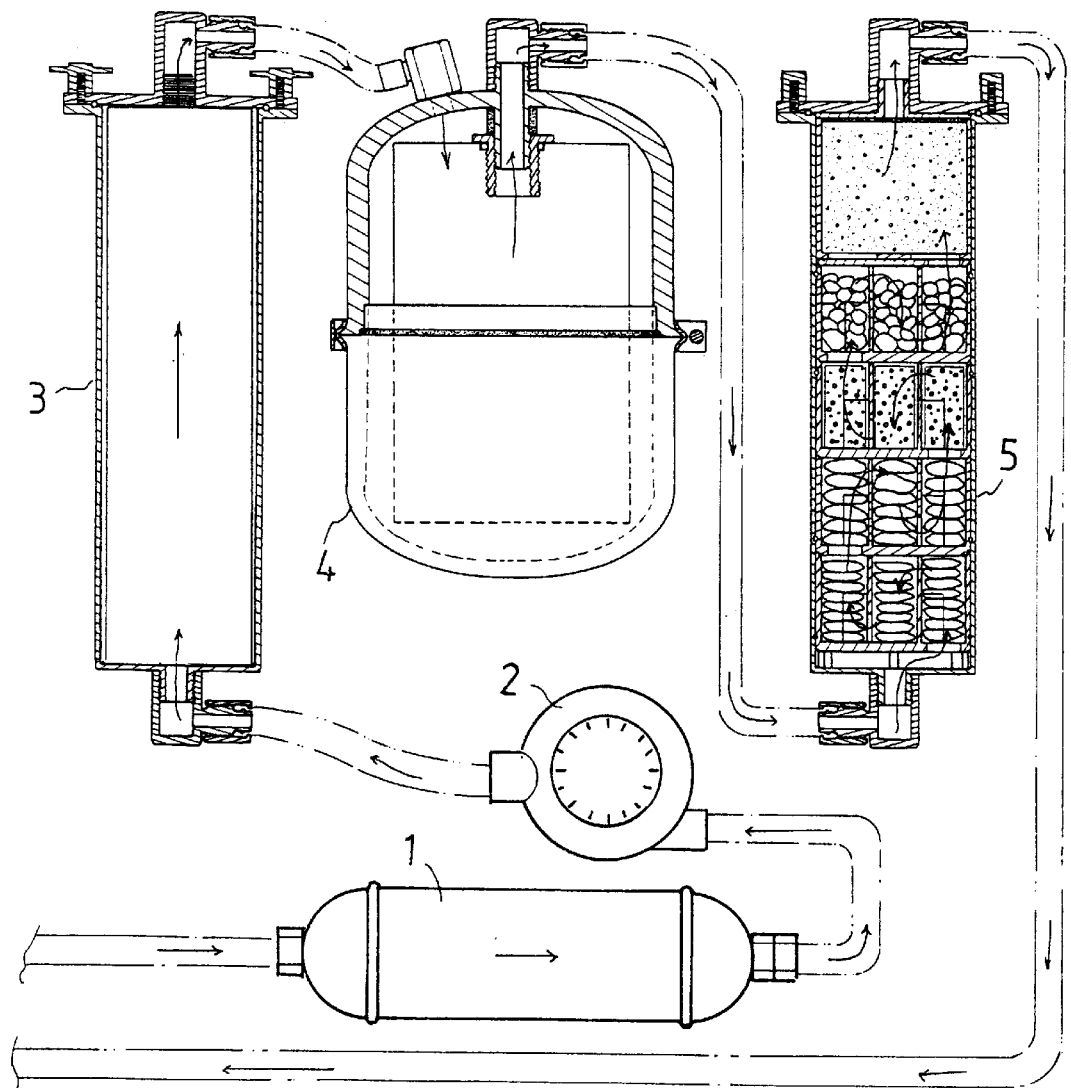
FIG. 8 shows the path that water flows in the water filtering system of the present invention.

Referring to FIGS. 5, 6 and 8, the fourth filtering device 5 has an inlet 511 defined in a first end thereof and a connection member 512 is connected the pipe coming from the third filtering device 4. Four units 52 are received in the fourth filtering device and each unit 52 has a first end which is an open end and a second end of each unit 52 has a plate 520 connected thereto wherein each plate 520 has an aperture. The units 52 are connected with each other in sequence by engaging the plate 520 of one unit 52 with the open end of an adjacent unit 52. The inlet 511 of the fourth filtering device 5 communicates with the aperture of the plate 520 of one unit 52 adjacent to the inlet 511 of the fourth filtering device 5. Each unit 2 has two separate boards 522, 523 to define three partitions 524, 525, 526, wherein two of the three partitions 524, 525, 526 respectively have a magnetic member 527 received therein and the two magnetic members 527 are separated by a middle partition 525. As shown in FIG. 7, the two magnetic members 527 are arranged to let two different polarities face to each other. One of the two separate boards 522, 523 has a notch 5231 defined in a top edge thereof and the other separate board 522 has a notch 5221 defined in a lower edge thereof so that the notch 5221 communicates with the aperture in the plate 520. The rest space in the two partitions 524, 526 and the middle partition 524 are filled with mineral stuff such as stones. A filtering cap 529 having a plurality of slots 5291 and a filtering neck 5292 is mounted to the open end of the unit 52 on the top of these units 52. A final filtering box 53 is received in the fourth filtering device 5 and located on the filtering cap 529. The final filtering box 53 has a screen 532 on the top and apertures 531 in the bottom of the final filtering box 53. A tubular outlet 533 extends from the top of the final filtering box 53 and a filtering plate 534 is connected to an underside of the top of the final filtering box 53.

A flange 517 extends radially outward from the second end of the fourth filtering device 5 and two threaded rods 518 extend from the flange 517. A groove 515 is defined in the flange 517 and a seal 516 is received in the groove 515. A cap 54 has two holes 543 through which the two threaded rods 518 extend. Two nuts 545 are threadedly mounted to the two threaded rods 518. The cap 54 has a central hole 544 defined therethrough and the tubular outlet 533 is threadedly engaged with the central hole 544. An outlet pipe engaged with the central hole 544 by a connection member 544.

As shown in FIG. 8, water is filtered in the first filtering device 1 to remove large particles and tiny particles in the water is removed by the second filtering device 3. Germs or other biological species in the water are attached by the activated carbon particles in the third filtering device 4. The water is magnetized by the magnetic members 527 to let the water carry more oxygen and the minerals provide healthy mineral elements.

While we have shown and described various embodiments in accordance with the present invention, it should be clear to those skilled in the art that further embodiments may be made without departing from the scope and spirit of the present invention.

What is claimed is:

1. A water filtering system comprising:

a first filtering device having a first end connected to an inlet pipe and a second end of said first filtering device connected to a fluid volume meter;

a second filtering device having a ceramic tube received therein and a first end of said second filtering device connected to said fluid volume meter by a pipe;

a third filtering device having an inlet connected to a second end of said second filtering device, activated carbon particles received in said third filtering device and an outlet of said third filtering device connected to a fourth filtering device, said fourth filtering device having an inlet defined in a first end thereof and an outlet defined in a second end of said fourth filtering device, a plurality of units received in said fourth filtering device, each unit having a first end which is an open end and a second end of each unit having a plate connected thereto, each plate having an aperture, said units connected with each other in sequence by engaging said plate of one unit with said open end of an adjacent unit, said inlet of said fourth filtering device communicating with said aperture of said plate of one unit adjacent to said inlet of said fourth filtering device, each unit having two separate boards to define three partitions, two of said three partitions respectively having a magnetic member received therein and said two magnetic members being separated by a middle partition of said three partitions, and a final filtering box received in said fourth filtering device and located adjacent to said outlet of said fourth filtering device.

2. The water filtering system as claimed in claim 1, wherein one of said two separate boards has a notch defined in a top edge thereof and the other separate board has a notch defined in a lower edge thereof.

3. The water filtering system as claimed in claim 1 wherein said fourth filtering device has a flange extending radially outward from said second end of said fourth filtering device, two threaded rods extending from said flange, a cap having two holes defined therethrough and said two threaded rods extending through said two holes in said cap, two nuts threadedly mounted to said two threaded rods, said cap having a central hole defined therethrough and an outlet pipe engaged with said central hole in said cap.

* * * * *